US012084394B1

(12) United States Patent
Yamashiro et al.

(10) Patent No.: US 12,084,394 B1
(45) Date of Patent: Sep. 10, 2024

(54) VERMICOMPOSTING APPARATUS AND METHOD

(71) Applicants: Christina Yumi Yamashiro, Santa Fe, NM (US); Claudio Fiordellisi, Santa Fe, NM (US)

(72) Inventors: Christina Yumi Yamashiro, Santa Fe, NM (US); Claudio Fiordellisi, Santa Fe, NM (US)

( * ) Notice: Subject to any disclaimer, the term of this patent is extended or adjusted under 35 U.S.C. 154(b) by 264 days.

(21) Appl. No.: 17/394,216

(22) Filed: Aug. 4, 2021

Related U.S. Application Data

(60) Provisional application No. 63/062,536, filed on Aug. 7, 2020.

(51) Int. Cl.
| | |
|---|---|
| *C05F 17/05* | (2020.01) |
| *C05F 9/04* | (2006.01) |
| *C05F 17/907* | (2020.01) |
| *C05F 17/971* | (2020.01) |

(52) U.S. Cl.
CPC ............. *C05F 17/05* (2020.01); *C05F 9/04* (2013.01); *C05F 17/907* (2020.01); *C05F 17/971* (2020.01)

(58) Field of Classification Search
CPC .......... C05F 17/05; C05F 9/04; C05F 17/907; C05F 17/971
See application file for complete search history.

(56) References Cited

U.S. PATENT DOCUMENTS

| | | |
|---|---|---|
| 3,837,810 A | 9/1974 | Richards et al. |
| 3,890,129 A | 6/1975 | Chester |
| 5,215,267 A * | 6/1993 | Taylor ............... C05F 17/907 241/101.8 |
| 5,589,391 A | 12/1996 | Fink |
| 6,576,462 B2 | 6/2003 | Thompson |

(Continued)

FOREIGN PATENT DOCUMENTS

| | | |
|---|---|---|
| AU | 665791 B2 | 1/1996 |
| CH | 684269 A5 | 8/1994 |

(Continued)

OTHER PUBLICATIONS

Gardners Supply Company. "Worm Composting How-to" <https://www.gardeners.com/how-to/worm-composting/5714.html> Sep. 23, 2018 (Year: 2018).*

(Continued)

*Primary Examiner* — Jennifer A Smith
(74) *Attorney, Agent, or Firm* — Santa Fe IP, LLC

(57) ABSTRACT

An apparatus for vermicomposting includes a compost container with an interior, a stand rotatably supporting the compost container between first and second positions, and first and second diametrically-opposed lids for accessing the interior of the compost container to fill and maintain the compost container with organic matter for vermicomposting therein. The first lid is positioned above the interior in the first position, and the second lid is positioned above the interior in the second position. A user can open one lid to fill and maintain the compost container, and after a sufficient period of time of vermicomposting to produce a layer of vermicast, the user can rotate the compost container from one position to the other and open the other lid to harvest the layer of vermicast. A method of using the apparatus is also disclosed.

6 Claims, 9 Drawing Sheets

(56) References Cited

U.S. PATENT DOCUMENTS

| | | | |
|---|---|---|---|
| 6,783,975 | B2 | 8/2004 | Windle |
| 7,081,147 | B2 | 7/2006 | Giesy |
| 8,951,787 | B1 | 2/2015 | O'Donnell |
| D799,135 | S | 10/2017 | Dror et al. |
| D799,774 | S | 10/2017 | Dror et al. |
| 10,125,055 | B2 | 11/2018 | Gaunt |
| 2004/0009587 | A1 | 1/2004 | Hoeschler |
| 2004/0029262 | A1 | 2/2004 | Walker |
| 2009/0325281 | A1 | 12/2009 | Stanford et al. |
| 2013/0052726 | A1 | 2/2013 | Ashby et al. |
| 2017/0327432 | A1 | 11/2017 | Mazor |

FOREIGN PATENT DOCUMENTS

| | | |
|---|---|---|
| CN | 105642662 A | 6/2016 |
| FR | 3 087 770 A1 | 5/2020 |
| WO | WO 2019/186026 A1 | 10/2019 |

OTHER PUBLICATIONS

Amazon. "Spin Bin 60 Gal. Outdoor Compost Tumbler Rotating Garden Composter Bin (Black)" 2020 (Year: 2020).*

*How to Create and Maintain an Indoor Worm Composing Bin*, accessed Jul. 20, 2020 from https://www.epa.gov/recycle/how-create-and-maintain-indoor-worm-composting-bin.

Lifetime 60028 65-Gallon Compost Tumbler, accessed May 11, 2020 from https://www.amazon.com/gp/product/B004QKU0MS.

Lifetime Double Bin Rotating Composter (100 gallon), accessed May 11, 2020 from https://gemplers.com/products/lifetime-double-bin-rotating-composter-100-gallon.

Mantis 4000-00-02 ComposT-Twin Composting Bin, accessed 2020 from https://www.amazon.com/Mantis-4000-00-02-ComposT-Twin-Composting-Bin/dp/B00008Z9ZF.

*Red Worm Composting—Way Too Much Fun With Worms!*, accessed Jul. 22, 2020 from https://www.redwormcomposting.com/.

Tumbler 5-Cubic Ft Compost Bin for Home Composting with Heavy Duty Frame, accessed May 11, 2020 from https://www.houzz.com/product/130452923-tumbler-5-cubic-ft-compost-bin-for-home-composting-with-heavy-duty-frame-contemporary-compost-bins.

Urban Worm Bag Version 2—Continuous Flow Worm Bin—Urban Worm Company, accessed Jul. 20, 2020 from https://shop.urbanwormcompany.com/collections/front-page-feature/products/urban-worm-bag-version-2.

*Welcome to the Urban Worm Company*, accessed Jul. 22, 2020 from https://urbanwormcompany.com/.

*Worm Inn Mega—Iowa Worm Composting*, accessed Jul. 20, 2020 from https://www.iowawormcomposting.com/product/worm-inn-mega/.

* cited by examiner

VERMICOMPOSTING APPARATUS AND METHOD

CROSS-REFERENCES TO RELATED APPLICATIONS

This application claims priority to U.S. Provisional Patent Application No. 63/062,536 filed Aug. 7, 2020 filed and entitled VERMICOMPOSTING APPARATUS AND METHOD, the entire contents of which is incorporated herein for all purposes by this reference.

BACKGROUND OF INVENTION

Field of Invention

This application relates, in general, to apparatuses for vermicomposting organic matter and conveniently harvesting vermicast, along with methods for their use.

Description of Related Art

Compost is organic matter that has been decomposed, which decomposed matter may be reused as soil conditioners in gardens, landscaping, and organic farming. The U.S. Environmental Protection Agency (EPA), encourages composting as food and yard waste currently make up more than 28% of what is thrown away. Composting diverts organic waste from landfills where it generates methane, and thus reduces a potent greenhouse gas. Compost promotes higher crop yields while reducing the need for chemical fertilizers. And compost can be used to remediate soils and otherwise improve the quality of soils. Due to such benefits, composting is increasingly popular.

Composting begins with organic waste being gathered where it can remain warm and moist to facilitate decomposition. Do-It-Yourselfers often use conventional bins in which carbon-rich "browns" (e.g., dead leaves, twigs, etc.) are layered with nitrogen-rich "greens" (e.g., vegetable and fruit scraps, coffee grounds, etc.), to which sufficient water provides moisture to help break down the organic waste. Generally, the layers in a conventional bin should be regularly mixed or turned to help break down the organic waste. Tumblers are a lower-maintenance alternative where such organic waste is added into an enclosed bin that can rotate to aerate and mix the browns and greens together and encourage decomposition. Tumblers should also be regularly turned to help break down the organic waste. Such conventional bins and tumblers are proven for batch composting (i.e., harvesting once all organic waste is composted), but generally do not allow for continuous flow-through (CFT) vermicomposting.

Worm or "vermi" composting utilizes worms to facilitate the decomposition process. "Vermicast" is the end-product of the organic matter broken down by the worms. In its simplest form, a vermicomposter may be a plastic bin filled with food scraps layered with bedding (e.g., shredded paper or cardboard), moistened with water, and filled with worms. As worms process the food scraps, the resulting vermicast may be periodically scooped out for harvesting. Some vermicomposters include a series of stacked trays in which food scraps are feed to worms stocked within the trays. As worms process the food scraps to vermicast in one tray, the worms generally climb to the next tray up seeking food after leaving the lower tray full of vermicast, which lower tray may then be removed and its vermicast harvested.

CFT vermicomposters are yet another alternative in which food scraps are added to the top of a bin and vermicast is removed from the bottom of the bin. Examples of small scale CFT vermicomposters include the Urban Worm Bag provided by the Urban Worm Company of Plymouth Meeting, PA, and the Worm Inn Mega provided by Iowa Worm Composting of Cambridge, IA. Vermicast is manually harvested through openings in the bottoms of such vermicomposter bins, but one must be careful to ensure only vermicast is removed without worms or non-composted material falling down and out.

Commercial CFT vermicomposters are also known. Michigan SoilWorks of Novi, MI provides a commercial CFT vermicomposter including a modular system with floor grates and a driven cutting bar that cuts a lower layer of vermicast that falls through the floor grates. There is less chance of worms and other non-composted materials from falling through the grates, however, one must gather the harvested vermicompost from beneath the modular system.

It would therefore be useful to provide an apparatus for vermicomposting and harvesting vermicast which overcome the above and other disadvantages of known composters and vermicomposters.

BRIEF SUMMARY

One aspect of the present invention is directed to an apparatus for vermicomposting organic matter. The apparatus may include: a compost container including an interior for receiving organic matter and worms therein to vermicompost the organic matter therein; a stand rotatably supporting the compost container, wherein the compost container is configured to rotate between first and second positions; and first and second diametrically-opposed lids for accessing the interior of the compost container to fill and maintain the compost container with organic matter for vermicomposting therein; whereby the first lid is positioned above the interior in the first position, and the second lid is positioned above the interior in the second position; whereby a user can open one of said first and second lids to fill and maintain the compost container, and after a sufficient period of time of vermicomposting to produce a lower layer of vermicast in the interior, the user can rotate the compost container from one of said first and second positions to the other of said first and second positions and open the other of said first and second lids to harvest the layer of vermicast.

The compost container may be configured to rotate approximately 180° between the first and second positions.

The apparatus may further include a bearing rotatably supporting the compost container on the stand. The bearing may be a journal bearing including a shaft extending from an end wall of the compost container, and a bearing surface mounted on the stand. The bearing may be a sealed bearing.

The compost container may include opposing side walls and opposing end walls. The side walls and the end walls may be planar. The side walls and the end walls may be wood. The compost container includes openings in one or more of said side and end walls to provide air to the interior to facilitate vermicomposting therein.

The apparatus may further include first and second hinges pivotally attaching the first and second lids to the compost container, respectively, and allowing selective access to the interior. The apparatus may further include first and second fasteners to secure the first and second lids against the compost container, respectively, in a closed position preventing access to and from the interior. At least one of the first and second fasteners may be a hasp.

The apparatus may further include a lock to selectively secure the compost container in the first and second positions. The lock may include a latch including (i) a sliding bolt mounted on the support and (ii) first and second keepers mounted on the compost container, wherein the sliding bolt being configured to extend and engage the first keeper when the compost container is in the first position, and the siding bolt being configured to extend and engage the second keeper when the compost container is in the second position.

Another aspect of the present invention is directed to a method for vermicomposting organic matter in a compost container configured to receive organic matter and worms in an interior thereof for vermicomposting therein, wherein the compost container is rotatably mounted on a stand for rotation between first and second positions. The method may include: opening one of first and second diametrically-opposed lids to access the interior of the compost container to fill and maintain the compost container with organic matter vermicomposting therein; after a sufficient period of time of vermicomposting to produce a lower layer of vermicast, rotating the compost container from one of said first and second positions to the other of said first and second positions; and opening the other of said first and second lids to harvest the layer of vermicast.

The rotating may include rotating the compost container approximately 180° between the first and second positions.

The compost container may include first and second hinges pivotally attaching the first and second lids to the compost container, respectively, and first and second fasteners to secure and close the first and second lids against the compost container. The opening-one step may include releasing one of said first and second fasteners and pivoting the one of said first and second lids about one of said first and second hinges to access the interior to fill and maintain the compost container.

The rotating may include, after a sufficient period of time of vermicomposting to produce a lower layer of vermicast, rotating the compost container from one of said first and second positions to the other of said first and second positions to reposition the layer of vermicast above a remainder of the organic matter and worms remaining in the interior.

The opening-the-other step may include releasing the other of said first and second fasteners and pivoting the other of said first and second lids about the other of said first and second hinges to access the interior.

The method may further include harvesting of the layer of vermicast while the vermicast is positioned above the remainder of the organic matter and worms remaining in the interior.

The compost container may include a lock to selectively secure the compost container in the first and second positions. And the method may further include disengaging the lock before rotating from one of the first and second positions, and engaging the lock after rotating to the other of the first and second positions.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention(s) as defined by the appended claims.

Figure 1:
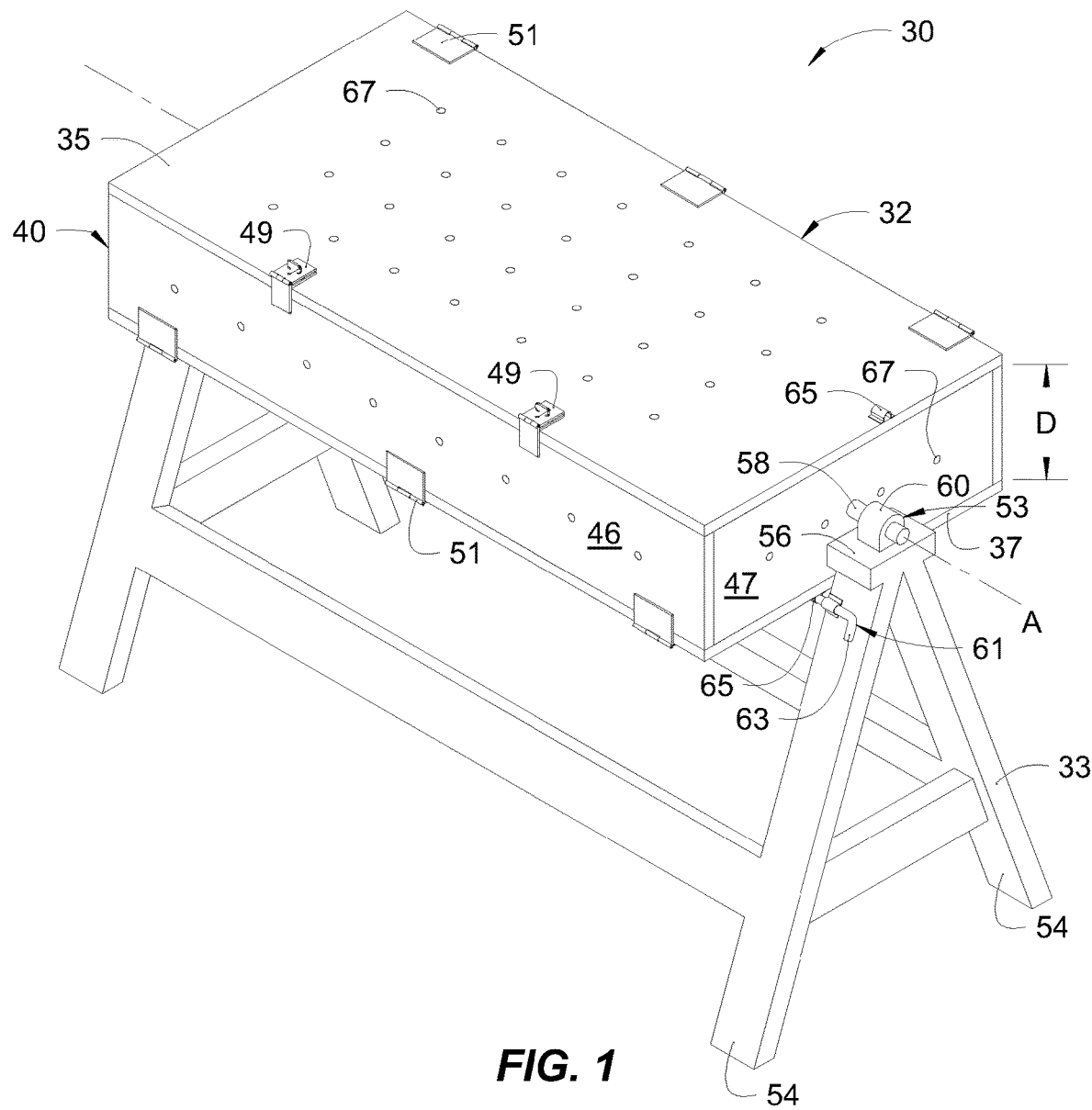
FIG. 1 is a perspective view of an exemplary vermicomposting apparatus having a rotatable compost bin in accordance with various aspects of the present invention.

Turning now to the drawings, wherein like components are designated by like reference numerals throughout the various figures, attention is directed to FIG. 1 illustrating a vermicomposting apparatus 30 for vermicomposting organic matter. The apparatus generally includes a compost bin 32 rotatably mounted on a stand 33. The bin has two lids 35, 37 and is rotatable between two positions such that each lid may be selectively positioned in a top position to allow access to an interior of the bin (see, e.g., interior 39 in FIG. 2) for convenient continuous flow-through (CFT) harvesting of vermicast as will become apparent below.

The compost bin or container 32 generally includes a body 40 having first and second openings 42, 44 (see FIG. 2 and FIG. 6, respectively) enclosed by first and second lids 35, 37 to define the interior and create a volume for receiving organic matter and worms, which volume is suitable for providing a dark, slightly humid and ventilated environment for vermicomposting organic matter.

As shown, the body may have discrete planar side walls 46 and end walls 47 to form a box-like container. However, one will appreciate that the body may have a wide variety of shapes. For example, planar walls may be utilized to form square, rectangular, hexagonal and/or a wide variety of other polygonal shaped bodies. Non-planar walls may be utilized to form circular, oval, obround or other curved bodies. One will also appreciate that the body may alternatively have a monocoque design. For example, the body may be monolithically formed of a carbon fiber material molded in the final shape of the body. One will further appreciate that the body may be formed of a combination of panels and/or monocoque portions, and/or by other suitable means and designs.

Regardless of the wall shapes, the walls may be formed of a variety of materials including composites, plastics, wood, and/or other suitable materials that provide sufficient structural integrity to support the weight of organic materials and worms within the body (and the container and lids). For example, assuming that composting organic matter, worms and resulting vermicast weigh approximately 25 pounds/cubic foot, a body generally measuring 5'L×2'W×12"D provides an interior of about 10 cubic feet and would need to support approximately 250 pounds therein. One will appreciate that larger configurations may require the static loading of 750-1000 pounds or more.

While the particular shape of the body may vary significantly, preferably the body provides a container having a sufficient depth "D" to allow for efficient vermicomposting. The container depth may be relatively shallow to ensure relatively quick processing of organic materials by the worms and provide a smaller distance for castings to settle to the bottom, which may be preferred by commercial vermicomposters, in which case, the depth may be about 6-15", more preferably about 8-12", and most preferably not greater than 10". Shallower depths may also be beneficial in providing compost bins of a manageable size and weight for manual turning by a user. However, residential vermicomposters may prefer a deeper depth to keep the turn-around time for harvesting less frequent, in which case the depth may be 15-30", more preferably about 18-24", and most preferably about 24". One will appreciate that the body may be readily scaled-up by increasing the length and width while preserving a relatively shallow depth.

Figure 2:
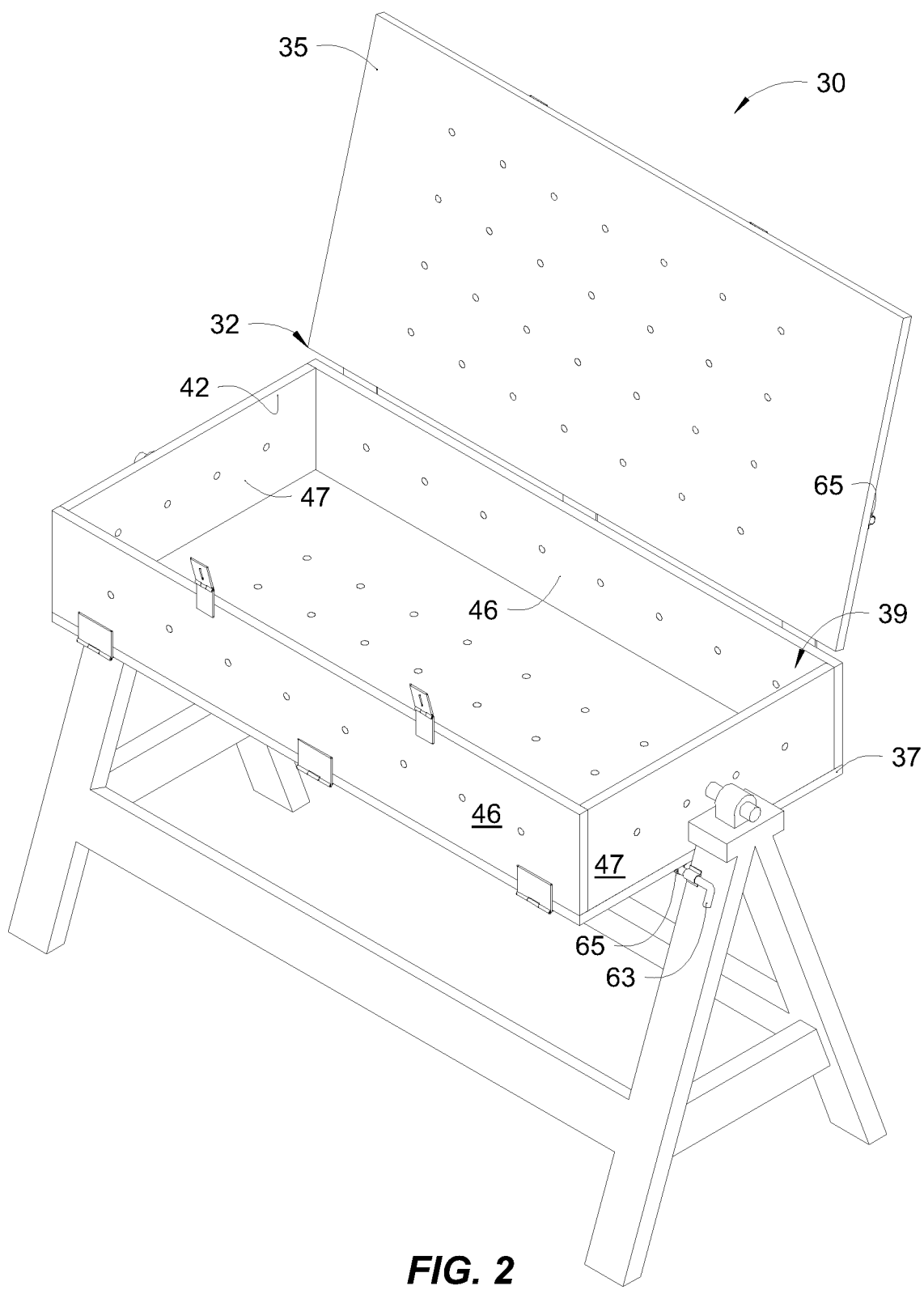
FIG. 2 is a perspective view of the vermicomposting apparatus of FIG. 1 showing a first lid opened for accessing the interior of the bin.
Figure 3:
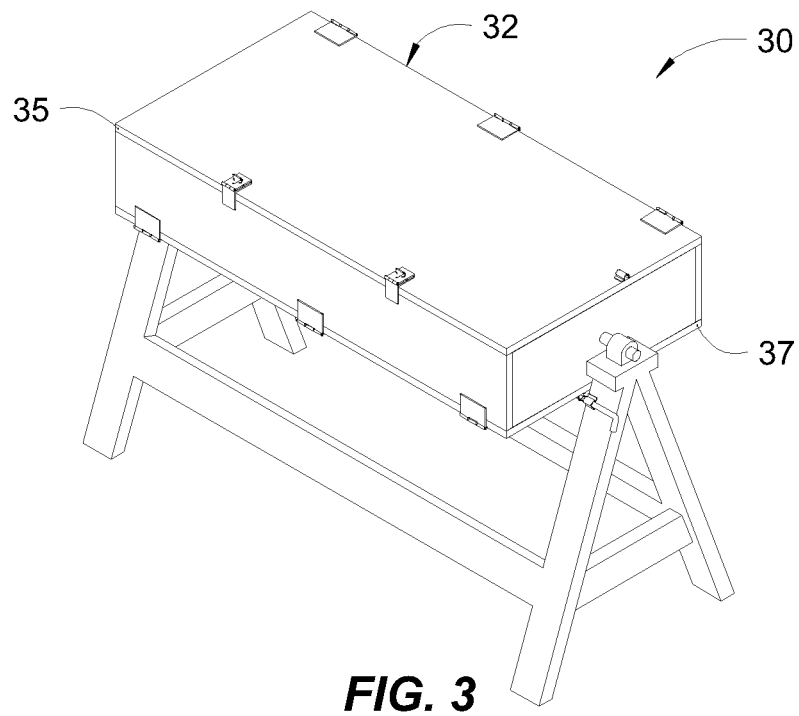
FIG. 3 is a perspective view of the vermicomposting apparatus of FIG. 1 showing the first lid closed and the bin unlocked and ready for rotation.
Figure 6:
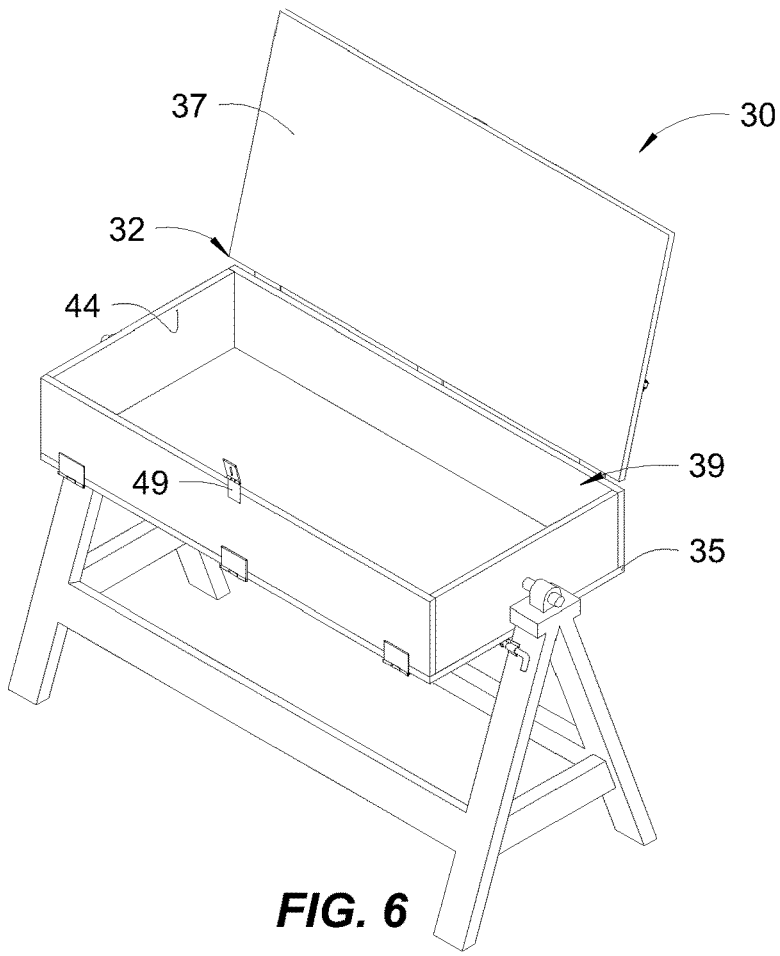
FIG. 6 is a perspective view of the vermicomposting apparatus of FIG. 1 showing the second lid open for accessing the interior of the bin.

The first and second lids 35, 37 are mounted on body 40 in a diametrically opposed manner to selectively close openings 42, 44 and enclose interior 39. As noted above, compost bin 32 is rotatable between two positions such that each lid may be selectively positioned in a top position to allow access to interior 39. The compost bin is shown in FIG. 2 in its first position in which the first lid 35 is in the top or uppermost position, and is shown in FIG. 6 in its second position in which second lid 37 is in the top position. It is noted that two fasteners 49 are shown on first lid in FIG. 1 while one fastener 49 is shown on second lid in FIG. 6 solely to provide a visual distinction between the two lids in the drawings—one will appreciate that the same number and types of closures may be provided on both lids.

Like the body and walls described above, the lids may be planar and define a box-like container, but they may also have a wide variety of shapes to form containers of different configurations. For example, the lids may be semi-cylindrical and/or ribbed to promote strength, or otherwise suitably shaped to provide sufficient structural integrity to support the weight of organic materials and worms within the body. And like the body above, the lids may be formed a wide variety of materials, including composites, plastics, wood, and/or other suitable materials that provide sufficient structural integrity.

In various embodiments, hinges 51 pivotally mount the lids 35, 37 to body 40 allowing for opening and closing the lids to selectively access the interior. One will appreciate that each lid is preferably opened only when it is in the top or uppermost position, for example, lid 35 opened when the compost bin is in its first position shown in FIG. 2, and lid 37 opened when the compost bin is in its second position shown in FIG. 6.

One will appreciate that other suitable means may be utilized to mount the lids to the body while allowing for access to the interior. For example, sliding-panels may be provided whereby the lid is slid to one side to provide access to the interior. Similarly, tambour doors may be provided whereby the lid is retracted by rolling upon itself (e.g., similar to a rolltop desk) to access the interior. One will appreciate that various lid configurations may be utilized to selectively access the interior.

Figure 4:
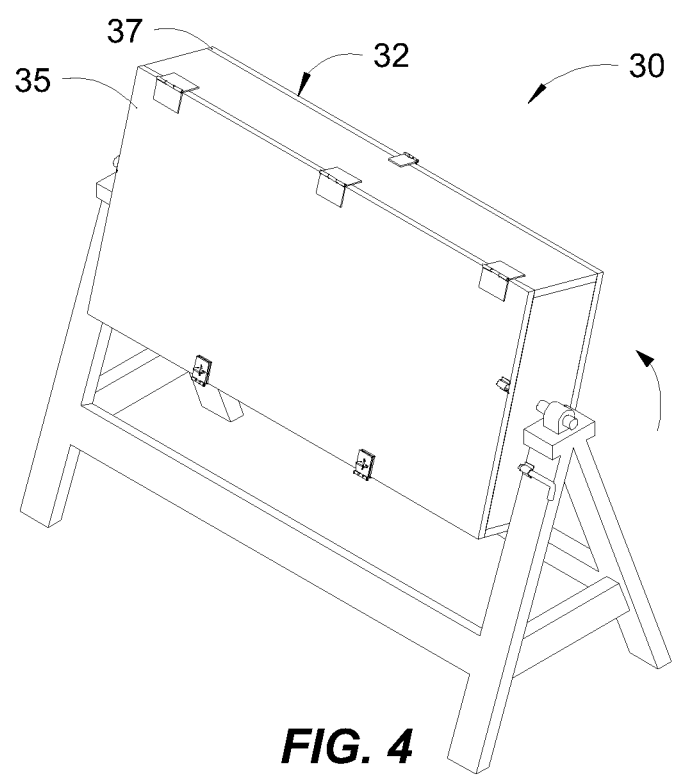
FIG. 4 is a perspective view of the vermicomposting apparatus of FIG. 1 showing the bin rotating from a first position to a second position.

In various embodiments, fasteners 49 releasably secure the lids to body 40 to selectively secure the lids in a closed position thus preventing access to and from the interior. As noted above, each lid is preferably opened only when it is in the top or uppermost position. The fasteners may be used to secure each lid against the body at all other times, for example, when the lid is in the bottom or lower most position (e.g., lid 37 in FIG. 1), or when the compost bin is being rotated (see, e.g., FIG. 4). The fasteners may be swivel-staple safety hasps which may secure the lids in their closed positions simply by twisting a swivel staple 90° relative to a hasp slot (see, e.g., FIG. 1), and unsecure the lids simply by aligning the swivel staple with the hasp slot (see, e.g., FIG. 5).

Figure 5:
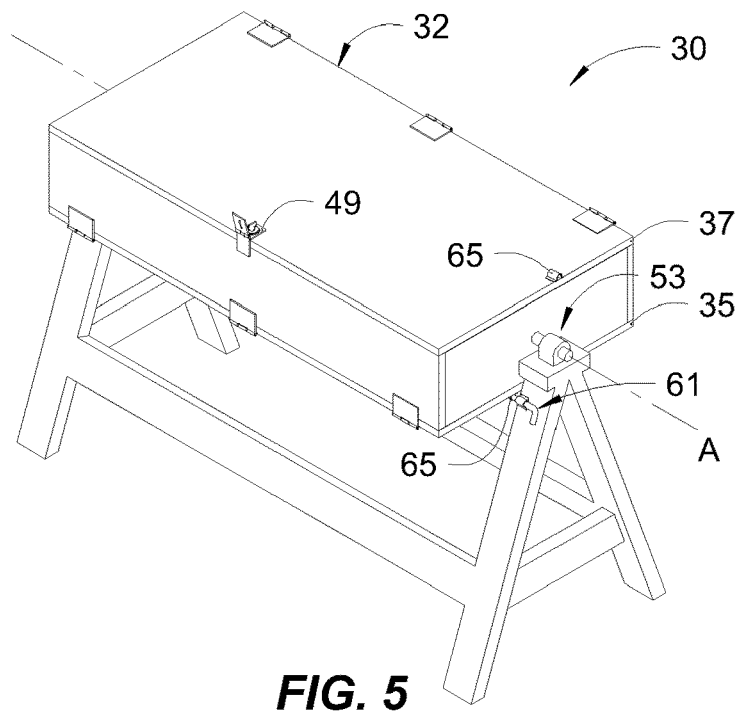
FIG. 5 is a perspective view of the vermicomposting apparatus of FIG. 1 showing the bin locked in a second position and a second lid unlocked and ready for opening and accessing the interior of the bin.

Compost bin 32 is rotatably mounted on stand 33 by bearings 53 such that the bin can rotate about axis A between its first and second positions (see, e.g., FIG. 1 and FIG. 5, respectively). In various embodiments, the compost bin is configured to rotate about 180° between the first and second positions. As first and second lids 35, 37 are diametrically opposed, 180° rotation is particularly well suited to position each of the lids at a top or uppermost position to facilitate loading and harvesting of the compost bin. One will appreciate that the apparatus may be configured to allow for less than or greater than 180° rotation, complete 360° rotation, or even greater rotation. Preferably, the rotation of compost bin is sufficient to position each lid in an upper position to allow a user to conveniently access the interior of the compost bin and harvest vermicast.

In various embodiments, the stand is of a A-frame design having diverging legs 54 converging at an apex 56 upon which bearing 53 is mounted. One will appreciate that various stand designs may be utilized, with a the primary design criteria being strong enough to support the compost bin for rotation about axis A. Suitable materials for the stand include composites, metals, plastic, wood and/or other suitable materials that provide sufficient structural integrity to support the weight of the compost bin and its contents for rotation about axis A.

In various embodiments, bearing 53 may be a journal bearing having a shaft 58 extends from an end wall 47 of body 40 that is rotatably coupled with a bearing surface 60 mounted on stand 33. The bearing may be a sealed bearing assembly, which bearings are particularly well suited for keeping lubricants in while keeping contaminants such as dirt and moisture out. One will appreciate that various bearing assemblies and/or other suitable means may be utilized to allow the compost bin to rotate or pivot relative to the stand.

In various embodiments, a lock 61 is provided to selectively secure the compost container relative to the stand in the first position (see, e.g., FIG. 1) or in the second position (see, e.g., FIG. 5). The lock may be a latch assembly including a sliding bolt 63 mounted on stand 33 and a keeper 65 mounted on compost bin 32. The sliding bolt may be configured to extend and engage the first keeper when the compost container is in the first position (FIG. 1), and configured to extend and engage the second keeper when the compost container is in the second position (FIG. 5). When the bolt is slid out from engagement of the keepers, a user is able to manually rotate the compost bin about axis A from one position to the other, align the bolt with a respective keeper, slide to engage the respective keeper, and thus lock the bin in the other position.

One will appreciate that various lock assemblies and/or other suitable means may be utilized to affix the compost bin in predetermined positions relative to the stand. For example, shaft 58 could extend past the legs of stand 33 and be provided with a lever or wheel at the shaft end to effect rotation, in which case, a lock assembly could be provided to affix the lever or wheel relative to the stand.

As noted above, the bin may be rotated manually, which manual configuration is particularly well suited for rural or under-developed areas because no electricity is necessary to rotate the bin. One will appreciate, however, a powered actuator may be provided in various embodiments including, but not limited to, large-scale commercial operations.

Generally, vermicomposting involves organic waste (e.g., fruit and vegetable scraps, coffee grounds, etc.) that is initially layered over a bedding (e.g., shredded cardboard and/or paper), and worms (e.g., red wigglers or red earthworms) are provided to process the organic waste and bedding into vermicast (i.e., worm castings). The worms digest the organic waste and bedding and excrete vermicast, which has a higher saturation of nutrients and a reduced level of contaminants than the organic materials before vermicomposting. Vermicast is generally finer than the other materials, and the volume of materials within the compost decreases as the materials are processed into vermicast. Since the vermicast is finer, it generally settles to the bottom of compost bin, while the worms generally travel upward in search of more food (i.e., the organic waste and/or bedding). And since the volume decreases as materials are processed, new organic waste may be added to the top of the compost bin and readily found by the upward-travelling worms.

Conventional CFT vermicomposters are generally configured to remove compost from the bottom of the compost bin, such as the Urban Worm Bag and the Worm Inn Mega discussed above. In contrast, the present invention provides for a rotating compost bin with multiple lids that conveniently allows harvesting vermicast from an upper position.

Figure 7A:
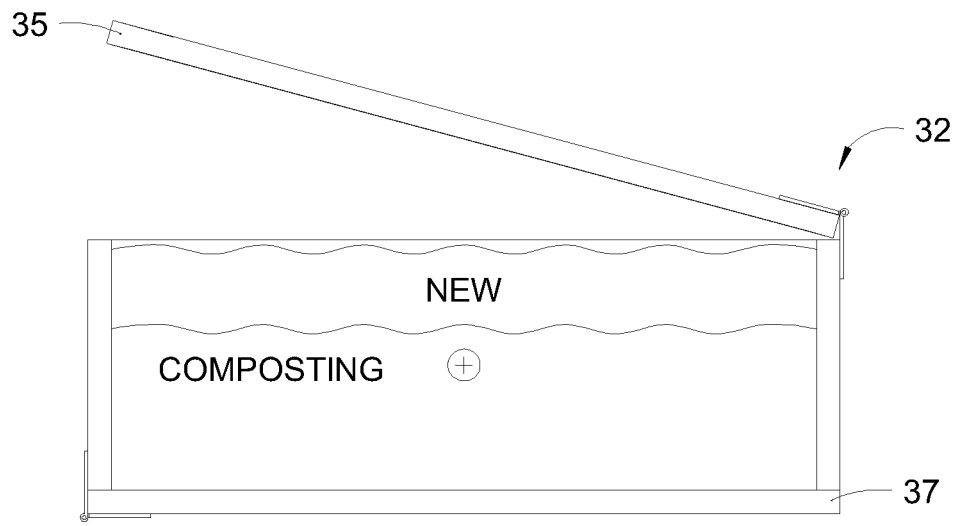
FIG. 7A, FIG. 7B, FIG. 7C, FIG. 7D, FIG. 7E, FIG. 7F, FIG. 7G and FIG. 7H are schematic end views of the vermicomposting apparatus of FIG. 1 illustrating a sequence of filling, composting, rotating, and harvesting vermicast from the compost bin.
Figure 7B:
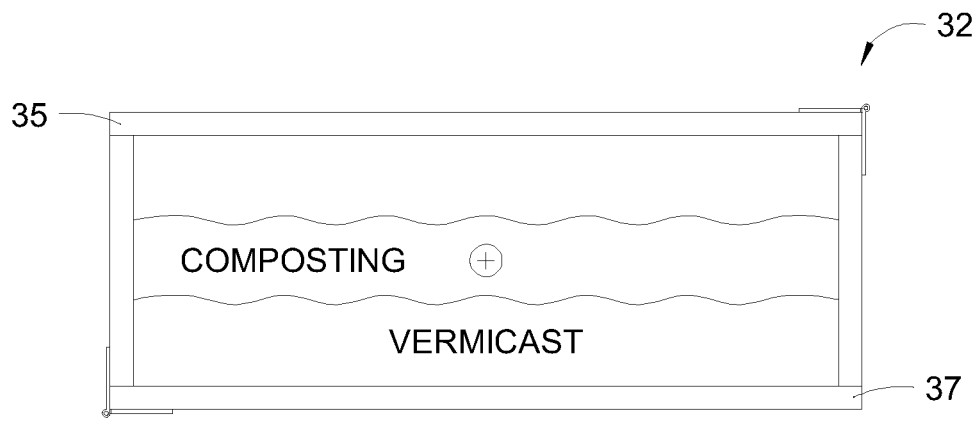
Figure 7C:
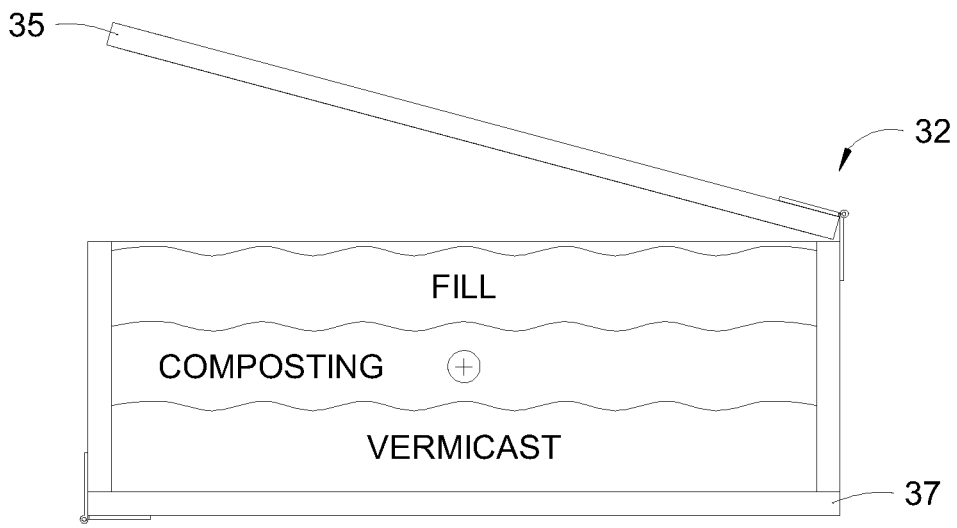
Figure 7D:
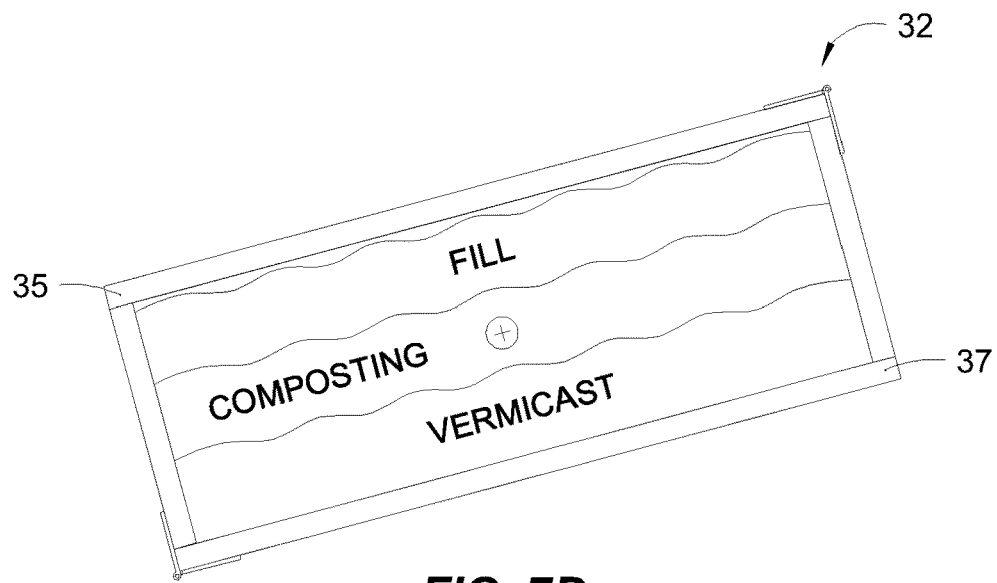
Figure 7E:
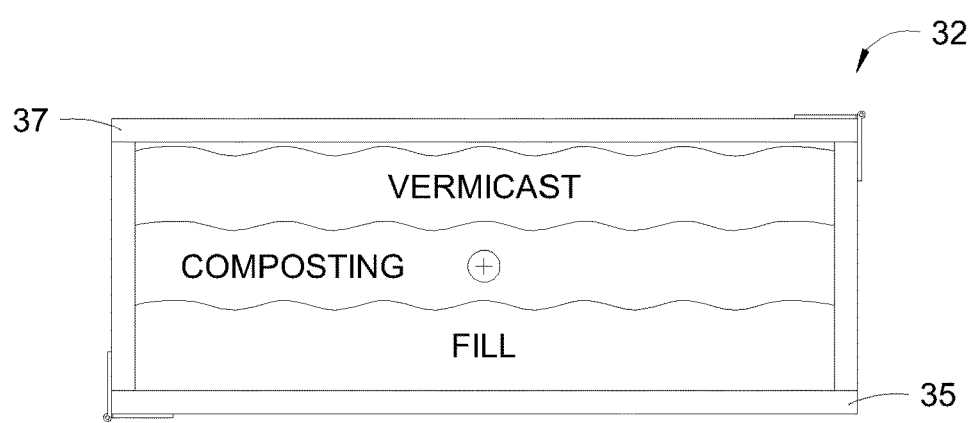
Figure 7F:
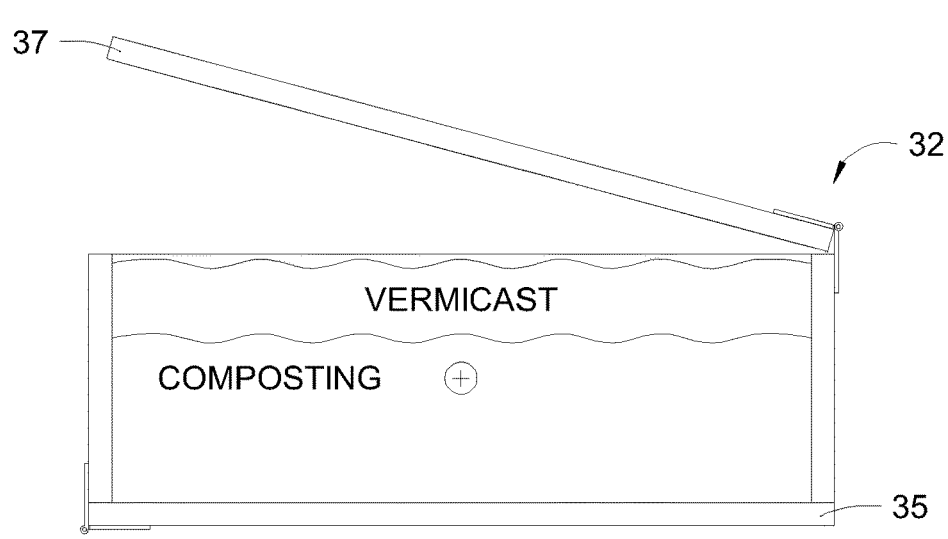

In particular, compost bin 32 may be rotated approximately 180° such that vermicast which had settled to the bottom of the compost bin in its first position (see, e.g., FIG. 1 and FIG. 7B) can be conveniently accessed from the top of the compost bin after it has been rotated to its second position (see, e.g., FIG. 6 and FIG. 7F). As such, a user may readily remove a layer of vermicast from the "now" top of the compost bin. Since the vermicast is now positioned on top, the user may remove the vermicast without worry that composting materials, food scraps, and/or worms will fall into and mix with the harvested vermicast because these materials are now located below the vermicast while the compost bin is in the second position.

Figure 7G:
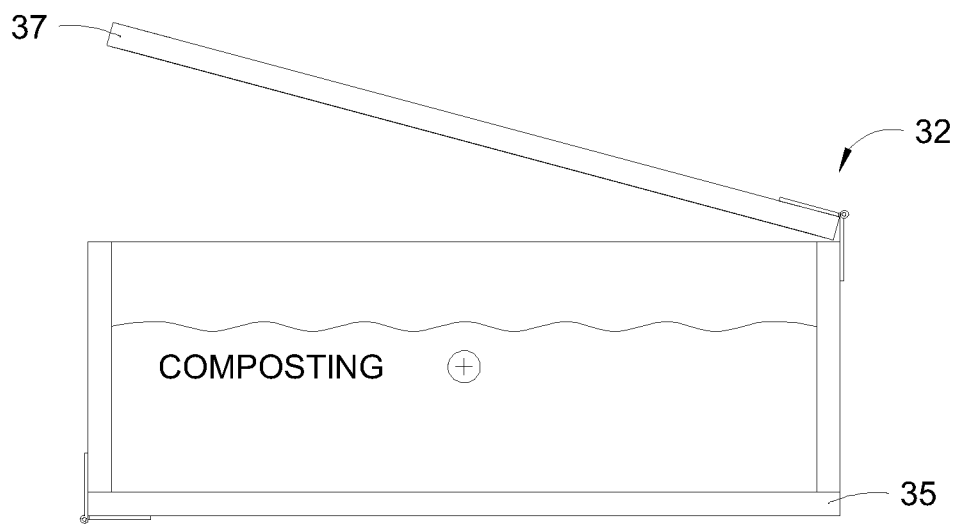
Figure 7H:
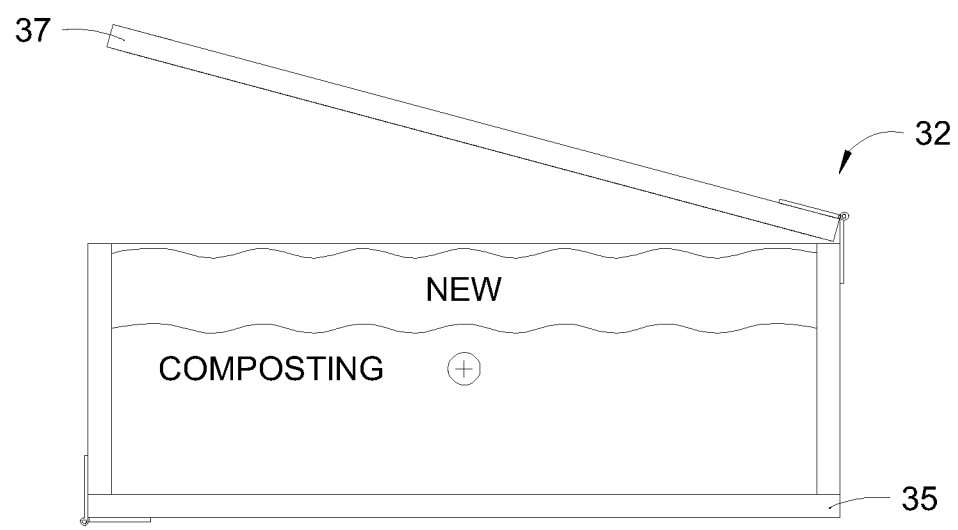

In operation and use, a user can open the lid that is positioned on top (e.g., lid 35) and maintain the compost container, that is, a user can keep compost bin 32 full by adding new organic waste (FIG. 7A). After a sufficient period of time of vermicomposting has passed to produce a lower layer of vermicast in the interior (FIG. 7B), the user can prepare the compost bin for rotation by "topping off" or filling the compost bin (FIG. 7C) such that its contents (i.e., the fill, composting, and vermicast materials) do not significantly shift while the compost bin is rotated (FIG. 7D). Once the compost bin is rotated about 180°, the contents of the compost bin are also rotated "upside-down" such that the vermicast is now positioned "on top" above the composting and fill materials (FIG. 7E). The user may then open the other lid (e.g., lid 37) that is now positioned on top and harvest the layer of vermicast, which previously settled to the bottom (FIG. 7B, FIG. 7C) but has now been rotated to the top (FIG. 7F). As such, a user can visually inspect to see if a layer of vermicast is ready for harvesting (if not ready, the user can rotate back to the position of FIG. 7C and wait a little longer). Once the layer of vermicast has been removed (FIG. 7G), the compost bin may again be supplied with new organic waste (FIG. 7H), whereby the process can be repeated again.

As noted above, the body and lids may be formed of a variety of materials including composites, plastics, wood, and/or other suitable materials that provide sufficient structural integrity to support the weight of organic materials and worms within the body (and the container and lids). One will appreciate that the materials may also be selected to provide insulation from temperature extremes, to provide a low evaporative rate of moisture from the contents within the compost bin, to prevent rust, to prevent leeching of man-made chemicals, to prevent absorption of moisture and structural weakening, to block UV light, and/or other desired parameters.

In various embodiments, openings 67 may be provided in body 40 and/or lids 35, 37 to provide air to the interior to facilitate vermicomposting therein. In an effort to simplify the drawings, such openings are shown only in FIG. 1, FIG. 2, and FIG. 8.

Figure 8:
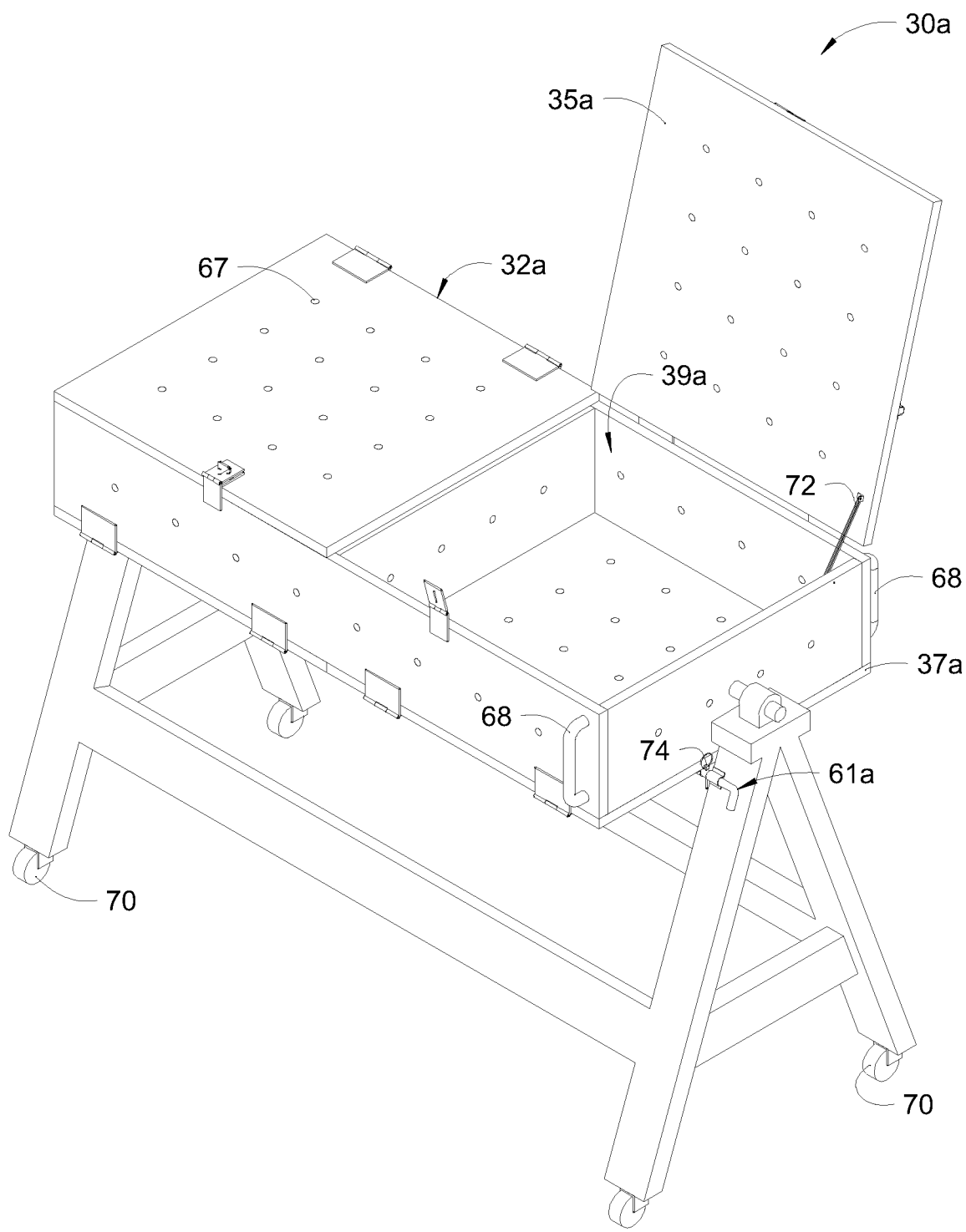
FIG. 8 is a perspective view of another exemplary vermicomposting apparatus having a rotatable compost bin in accordance with various aspects of the present invention.

In various embodiments, the apparatus of the present invention may include one or more features illustrated in FIG. 8, in which apparatus 30a is similar to apparatus 30 described above but includes handles 68 to facilitate manual rotation of the compost bin, wheels 70 to facilitate movement of the assembly (e.g., rolling around a garage or carport), a prop 72 to ensure an open lid 35a does not inadvertently close, a linchpin 74 for ensuring that lock 61a does not inadvertently unlock, and segmented lids 35, 37 allowing access to compartments of interior 39a. In operation and use, apparatus 30a is otherwise used in substantially the same manner as apparatus 30 described above.

One will appreciate that these features may have a wide variety of configurations. For example: the handles may be knobs or other grips allowing a user to grasp and rotate the compost bin (e.g., a lever or wheel attached to the end of shaft 58); the wheels may be locking castor wheels allowing a user to move the assembly to a desired location and lock the castor wheels to secure the assembly in the desired location; the lid prop may be a conventional hood-prop rod; the linchpin could be a simple cotter pin or other safety mechanism; two or more segmented lids may be provided to access a corresponding number of compartments; and so on.

Figure 9:
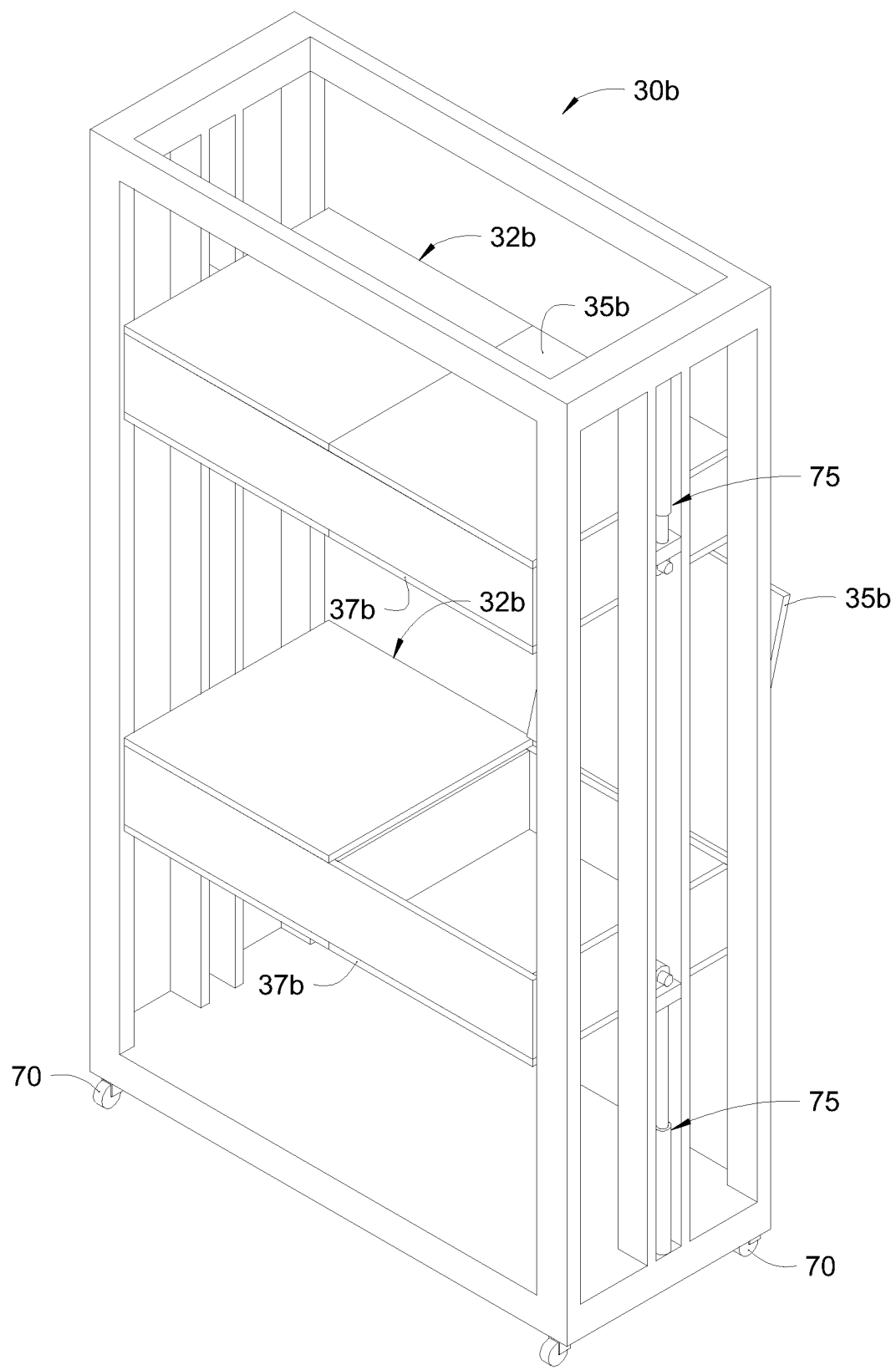
FIG. 9 is a perspective view of another exemplary vermicomposting apparatus having rotatable compost bins in accordance with various aspects of the present invention.

In various embodiments, the apparatus of the present invention may include one or more features illustrated in FIG. 9, in which apparatus 30b is similar to apparatuses 30 and 30a described above but includes vertically spaced compost bins 32b and height adjusters 75. As shown, multiple compost bins can be positioned one above the other in order to increase vermicomposting throughput within a given foot print. In particular, stacking two compost bins vertically above one another can essentially double throughput within the same floor space as one compost bin. And the height adjusters are provided in order to position each compost bin at a convenient height for filling, rotating and/or harvesting. In operation and use, apparatus 30*b* is otherwise used in substantially the same manner as those described above.

One will also appreciate that these stacking and height-adjustable features may have a wide variety of configurations. For example, three, four or more compost bins may be vertically stacked in order to further multiply throughput within a given footprint. Also, the height adjusters may be in the form of various actuators including, but not limited to, hydraulic and/or pneumatic cylinders (single or double acting), electric linear actuators, motorized rotary actuators, simple mechanical actuators such as a lead screw, chain drive, rack and pinion and the like, or other suitable means to raise and lower the bearing support of each compost bin's axis as desired.

For convenience in explanation and accurate definition in the appended claims, the terms "up" or "upper", "down" or "lower", "inside" and "outside" are used to describe features of the exemplary embodiments with reference to the positions of such features as displayed in the figures.

In many respects, various modified features of the various figures resemble those of preceding features and the same reference numerals followed by subscripts "a" and "b" designate corresponding parts.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for vermicomposting organic matter in a compost container configured to receive organic matter and worms in an interior thereof for vermicomposting therein, wherein the compost container is rotatably mounted on a stand for rotation between first and second positions, the method comprising:

opening one of first and second diametrically-opposed lids to access the interior of the compost container to fill and maintain the compost container with organic matter vermicomposting therein through which the worms digest the organic matter and excrete vermicast that settles to the bottom of the compost container below the organic matter;

after a sufficient period of time of vermicomposting to produce a layer of vermicast below the organic matter, rotating the compost container from one of said first and second positions to the other of said first and second positions; and opening the other of said first and second lids to harvest the layer of vermicast now above the organic material;

wherein the compost container includes first and second hinges pivotally attaching the first and second lids to the compost container, respectively, and first and second fasteners to secure and close the first and second lids against the compost container, and wherein the opening-one step includes releasing one of said first and second fasteners and pivoting the one of said first and second lids about one of said first and second hinges to access the interior to fill and maintain the compost container.

2. A method according to claim 1, wherein the rotating comprises rotating the compost container approximately 180° between the first and second positions.

3. A method according to claim 1, wherein the rotating comprises, after a sufficient period of time of vermicomposting to produce a lower layer of vermicast, rotating the compost container from one of said first and second positions to the other of said first and second positions to reposition the layer of vermicast above a remainder of the organic matter and worms remaining in the interior.

4. A method according to claim 3, the opening-the-other step includes releasing the other of said first and second fasteners and pivoting the other of said first and second lids about the other of said first and second hinges to access the interior.

5. A method according to claim 4, the method further comprising harvesting of the layer of vermicast while the vermicast is positioned above the remainder of the organic matter and worms remaining in the interior.

6. A method according to claim 1, wherein the compost container includes a lock to selectively secure the compost container in the first and second positions, the method further comprising disengaging the lock before rotating from one of the first and second positions, and engaging the lock after rotating to the other of the first and second positions.

\* \* \* \* \*